United States Patent
Shimada et al.

(10) Patent No.: US 8,363,547 B2
(45) Date of Patent: Jan. 29, 2013

(54) COMMUNICATION METHOD AND RADIO NETWORK CONTROL DEVICE IN A MOBILE COMMUNICATION SYSTEM

(75) Inventors: Takeshi Shimada, Kawasaki (JP); Shinya Hatakeyama, Kawasaki (JP); Junichi Ehara, Kawasaki (JP); Ken Takashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 12/633,544

(22) Filed: Dec. 8, 2009

(65) Prior Publication Data

US 2010/0080121 A1  Apr. 1, 2010

Related U.S. Application Data

(63) Continuation of application No. PCT/JP2007/061786, filed on Jun. 12, 2007.

(51) Int. Cl.
*H04L 12/26* (2006.01)

(52) U.S. Cl. .......................... 370/230; 370/235; 709/235

(58) Field of Classification Search .......... 370/229–240; 709/230, 232, 235
See application file for complete search history.

(56) References Cited

U.S. PATENT DOCUMENTS

| | | | | |
|---|---|---|---|---|
| 6,246,878 B1 * | 6/2001 | Wallentin | | 455/442 |
| 6,571,098 B1 | 5/2003 | Endou | | |
| 2003/0161284 A1 * | 8/2003 | Chen | | 370/331 |
| 2008/0008112 A1 | 1/2008 | Lee | | |
| 2008/0026754 A1 * | 1/2008 | Chang et al. | | 455/436 |
| 2010/0080121 A1 * | 4/2010 | Shimada et al. | | 370/230 |

FOREIGN PATENT DOCUMENTS

| | | |
|---|---|---|
| JP | 2001524791 | 12/2001 |
| JP | 2003111135 A | 4/2003 |
| WO | 9927740 | 6/1999 |
| WO | 9941850 | 8/1999 |
| WO | 2004034715 | 4/2004 |
| WO | 2006057338 | 6/2006 |

OTHER PUBLICATIONS

International Search Report dated Sep. 4, 2007.
"3rd Generation Partnership Project; Technical Specification Group Radio Access Network; UTRAN overall description (Release 5)", 3GPP TS 25.401 V5.10.0, Jun. 2005, p. 26.
"3rd Generation Partnership Project; Technical Specification Group Radio Access Network; UTRAN Iur interface general aspects and principles (Release 5)", 3GPP Organizational Partners, 3GPP TS 25.420, V5.3.0, Jun. 2005, p. 14.
"3rd Generation Partnership Project; Technical Specification Group Radio Access Network; Medium Access Control (MAC) protocol specification (Release 7)", 3GPP TS 25.321 V7.3.0 (Dec. 2006).
Notification of Reason for Refusal dated Sep. 13, 2011 received in Japanese Patent Application No. 2009-519088.
Japanese Decision of Refusal dated Dec. 6, 2011 issued in application No. 2009-519088.

* cited by examiner

*Primary Examiner* — Luat Phung
(74) *Attorney, Agent, or Firm* — Murphy & King, P.C.

(57) ABSTRACT

A mobile communication system in which a mobile station copies data and transmits that copied data to a plurality of base stations, each base station sends that copied data to a serving radio network control device (S-RNC) directly or via a drift radio network control device (D-RNC), and the S-RNC selectively combines and outputs the received copied data; wherein a congestion monitoring unit monitors the congestion state of a line between the D-RNC and S-RNC, and when that line is congested, a D-RNC selectively combines the copied data that is inputted from the plurality of base stations and sends the result to that line, and when the line is not congested, the D-RNC sends the copied data that is inputted from the plurality of base stations to the line without performing selective combination.

4 Claims, 13 Drawing Sheets

COMMUNICATION METHOD AND RADIO NETWORK CONTROL DEVICE IN A MOBILE COMMUNICATION SYSTEM

CROSS REFERENCE TO RELATED APPLICATION

This application is a continuation of PCT application of PCT/JP2007/061786, which was filed on Jun. 12, 2007.

BACKGROUND OF THE INVENTION

The present invention relates to a communication method and radio network control device in a mobile communication system.

The present invention is particularly suited for use in a mobile communication system in which data is copied at a mobile station, after which that copied data is sent to a plurality of base stations, then each base station sends that copied data directly or by way of a drift radio network control device (D-RNC) to a serving radio network control device (S-RNC), after which the S-RNC selectively combines and outputs a plurality of received data.

A mobile communication system such as W-CDMA is a radio communication system in which the wired portion and radio portion of a communication area are shared by a plurality of users, and as shown in FIG. 10, includes: a core network (CN) 1; radio network control devices (RNC: Radio Network Controllers) 2, 3; radio base stations (Nodes B) $4_1$ to $4_3$, $5_1$ to $5_3$; and mobile stations (UE: User Equipment) $6_1$ to $6_3$. A radio network controller RNC is connected with a radio base station Node via an ATM network or IP network using a wired connection, and a radio base station (Node B) is connected with a mobile station UE by a radio connection.

The core network 1 is a network for performing routing in the mobile communication system, and it can comprise: an ATM switching network, packet switching network, router network, and the like. The core network 1 can also be connected to other public networks (PSTN) such that the mobile stations $6_1$ to $6_3$ are capable of performing communication with fixed telephones and the like.

The radio network devices (RNC) 2, 3 are positioned as host devices to the radio base stations (hereafter referred to as base stations) $4_1$ to $4_3$, $5_1$ to $5_3$, and perform control of these base stations (management of radio resources that are used by the base stations, etc.). Moreover, the RNC 2, 3 also comprise a selective combination function that receives identical data from a mobile station 6i via the plurality of subordinate base stations, selects data with the best quality, and outputs that data to the core network 1 side. The base stations $4_1$-$4_3$ and $5_1$-$5_3$ perform radio communication with a mobile station 6i, where RNC 2 manages the radio resources for the base stations $4_1$ to $4_3$, and RNC 3 manages the radio resources for the base stations $5_1$ to $5_3$. When a mobile station 6i enters the radio communication area of a base station, the mobile station 6i establishes a radio communication line with that base station, and performs communication with another communication device via the core network 1.

Iur is regulated as the interface between the core network and a RNC, Iur is regulated as the interface between a pair of RNC, Iub is regulated as the interface between a RNC and each of the base stations, and Uu is regulated as the interface between a base station and a mobile station.

In the mobile communication system described above, it has been proposed that in order for high-speed data transmission to be possible in the downlink direction, the HSDPA (High Speed Downlink Packet Access) method be employed, and that in order for high-speed data transmission to be possible in the uplink direction, the HSUPA (High Speed Uplink Packet Access) method be employed (refer to 3GPP TS 25.321 V7.30). The HSUPA method is a broadband data transmission function comprising an E-DCH (Enhanced Dedicated Transport Channel) for the purpose of improving the performance of individual channels DCH (dedicated channels) when a mobile station transmits data in the uplink direction.

FIG. 11 is a drawing explaining the transmission paths of uplink traffic when HSUPA is applied to a standard W-CDMA system, where there is a plurality of transmission paths (branches) formed between a mobile station 6 and a serving radio network controller (S-RNC) 2. The mobile station 6 copies the data to be transmitted and distributes the copied data to a plurality of base stations (Nodes B) $4_1$ to $4_3$. When doing this, the mobile station 6 attaches a TSN (Transmission Sequence Number) to each copy of data to indicate the transmission order of the data. In other words, as shown in FIG. 12, when the mobile station 6 transmits data Xn to the core network 1, the mobile station 6 makes copies of that data Xn equal to the number of paths (3 copies in the figure), attaches the same transmission sequence number TSN to each copy of the data Xn and distributes the data to a plurality of base stations using an independent communication method (for example changes the spreading code). Each transmission path is formed by the radio zone between the mobile station and the base station, and the inter-station line (Iub) between the base station and the S-RNC, such that the copied data is finally brought together at the S-RNC 2 via each of the transmission paths. The S-RNC receives the copied data Xn via each respective path, then selectively combines the data by referencing and rearranging the TSN, and sends the selectively combined data to the core network CN. By having redundancy of transmission paths in this way, even when there may be a drop in transmission quality in each branch or there may be a missing frame, the HSUPA method is designed to reduce effects thereof and maintain overall transmission quality.

FIG. 13 is a drawing showing the layered structure (protocol stack) of each unit in the HSUPA method, where the mobile station (UE) comprises a physical layer (PHY) in layer L1, and MAC sub-layers (MAC-d, MAC-es/MAC-e) in layer L2. The MAC sub-layers include a MAC-d (MAC dedicated) layer, MAC-e (MAC enhanced) layer, and MAC-es (MAC enhanced sub-layer). The base station (Node B) comprises a physical layer (PHY) for communicating with the mobile station according to the Uu interface, and a TNL layer (Transport Network Layer) for packet communication with the radio network controller (RNC) according to the Iub interface, and further comprises a MAC-e layer and EDCH FP (Enhanced DCH Frame Protocol) layer. The radio network controller (RNC) comprises a TNL layer, EDCH FP layer, MAC-es layer and MAC-d layer.

FIG. 14 is a drawing explaining the procedure by the mobile station for creating data TRB (transport block MAC-e PDU). First, the mobile station 6 uses data that is sent via a dedicated channel such as DTCH (Dedicated Traffic Channel) or DCCH (Dedicated Control Channel) and creates a data packet (MAC-d PDU data) for the MAC-d layer. This MAC-d PDU data is the same as the data packet (RLC PDU) data) of the RLC sub-layer. Next, the mobile station multiplexes some MAC-d PDU data, and attaches a transmission sequence number TSN at the start of the data to create data (MAC-es PDU) for the MAC-es layer. After that, the mobile station multiplexes a plurality of these MAC-es PDU data, and attaches a MAC-e header to the start of that data to create data (MAC-e PDU) for the MAC-e layer, then sends this data to the base station according to the Uu interface as a transport block TRB. The MAC-e header is a header that specifies the DDI (Data Description Identifier) and N for each MAC-es PDU data, where N specifies the number of MAC-d PDU data that are included in MAC-es PDU data, and DDI specifies the size and ID of each MAC-d PDU data.

FIG. 15 is a drawing explaining the multiplexing relationship of the MAC-d PDU, MAC-es PDU and MAC-e PDU data, where N1 number of MAC-d PDU data are multiplexed to form one MAC-es PDU data, and n number of MAC-es PDU data are multiplexed to form one MAC-e PDU data.

After receiving a transport block (MAC-e PDU) from the mobile station, the base station creates an EDCH Iub FP frame according to the EDCH FP protocol and sends that EDCH Iub FP frame to the RNC in the TNL layer. That is, the base station adds a header CRC, FSN (Frame Sequence Number), CFN (Connection Frame Sequence), number of MAC-es PDU data, and the like to the header of the MAC-e PDU data to create an EDCH Iub FP frame.

When the RNC receives an EDCH Iub FP frame for each logical channel, the RNC performs the reverse operation as the mobile station by reference to the MAC-e header, separates the MAC-e PDU data into MAC-es PDU data, and then further separates the MAC-es PDU data into MAC-d PDU data. Next, since there is a plurality of paths between the RNC and UE, the RNC selectively combines and rearranges the data received through each of the paths by referencing the transmission sequence numbers TSN that were attached at the time the mobile station transmitted the data, then gives the combined and rearranged MAC-d PDU data to the RLC sub-layer and transmits the dedicated channel data to the core network via that RLC sub-layer.

FIG. 11 described above is the most typical example of the application of the HSUPA method, however, as the mobile station moves, the copied data from that mobile station often arrives at the S-RNC 2 after first passing through a drift RNC (D-RNC) other than that S-RNC 2. FIG. 16 is a drawing explaining that transmission path, and shows the case in which the mobile station 6 moves from the state shown in FIG. 11 and transmits copied data to the S-RNC 2 via the base stations 5₁ and 5₂ that are subordinate to a drift RNC (D-RNC) 3 other than the S-RNC 2. In this case, each copied data that is transmitted from the mobile station 6 to the base stations 5₁ and 5₂ arrives at the S-RNC 2 via the inter-station line (Iur) between the D-RNC and S-RNC. The S-RNC 2 by referencing the TSN, rearranges the copied data that was received via that line (Iur) and the copied data that was received from the base station 4₃ via the other line (Iub) and selectively combines the copied data, then sends the selectively combined data to the core network CN.

As was described above, the HSUPA method, which is based on the distribution of the copied data and selective combination of data, has redundancy in the E-DCH (Enhanced Dedicated Transport Channel) traffic. This redundancy is useful from the aspect of maintaining the transmission quality that is provided to the mobile station; for example, it is possible to improve the transmission quality that can be provided to the mobile station more the higher the redundancy is improved by increasing the number of branches or the like. However, on the other hand, the allowable bandwidth for each of the lines of the transmission path is limited, while at the same time, the required cost that corresponds to the size of that allowable bandwidth also increases. Particularly, in the case of traffic of an E-DCH frame, whose absolute amount itself is large when compared with other traffic, it is feasible that the bandwidth of the lines of the transmission path will be greatly stressed due to that redundancy.

When the lines of the transmission path become congested and the amount of flow over the lines finally exceeds the allowable bandwidth, the frames on that transmission path are discarded, which not only affects on the E-DCH transmission quality, but also has an unpredictable adverse effect on other traffic that passes over the same path. Therefore, the occurrence of such a condition much be avoided as much as possible.

Incidentally, as shown in FIG. 16, there is a possibility that redundant traffic will become extremely concentrated in the line (Iur) that connects between the D-RNC and S-RNC. In the case shown in FIG. 16, there are two branches that pass through the D-RNC, so in the case in which the transmission condition of each of the branches is ideal, two EDCH frames having the same content are transmitted over the same physical line (Iur), and finally, as a result, one is selected by the selective combination that is performed by the S-RNC, and the other frame is discarded. In other words, the traffic that flows over the Iur line is double the traffic that flows over the Iub line, and as a result half of that traffic becomes useless.

A COMA mobile system has been proposed that minimizes the waiting delay for performing the selective combination process by the RNC (refer to Japanese patent application 2001-25046). In this related art, the RNC comprises a through mode in which received uplink data is sent to the core network as is without being stored in a buffer, and when there is only one uplink communication connection, received uplink data is sent by the through mode to the core network without waiting for the selective combination process, and by doing so, minimizes the wait delay for the selective combination process. However, in this related art, when there is a plurality of communication connections, and especially when the radio base station controller on the drift side is included in the path, the radio base station controller (D-RNC) performs always normal selective combination, and redundancy of the transmission path is always lost.

SUMMARY OF THE INVENTION

Taking into consideration the problems mentioned above, the object of the present invention is to make it possible to effectively use bandwidth while taking into consideration the transmission quality that is provided to the mobile station.

Another object of the present invention is to control for each mobile station whether or not the selective combination is performed, and by doing so, improve the transmission quality, or reduce traffic on the line connecting between the D-RNC and S-RNC.

Another object of the present invention is to make it possible to immediately change to a system that is suitable to the operating conditions when there was a change in the system operating conditions such as a change in the maximum allowable bandwidth of the line connecting between the D-RNC and S-RNC.

Another object of the present invention is to improve stability of the control by eliminating the possibility that the control operation will diverge.

Another object of the present invention is to keep the number of E-DCH or in other words, the number of mobile stations for which there is a possibility that the transmission quality will be degraded at a minimum.

Another object of the present invention is to more effectively reduce the traffic of redundant E-DCH that flow on the Iur line, and to reduce the drop in transmission quality on each mobile station.

In the present invention, in a mobile communication system in which a plurality of base stations are capable of receiving data having the same contents from one mobile station, and first and second selection devices are capable of performing selective combination of data that is received from a mobile station via the base station and that has the same contents, when the line between the first selection device and the second selection device is congested, the first selection device sends the result obtained by performing the selective combination of data received, from the mobile station via the base station, to the second selection device, and when the line between the first selection device and the second selection device is not congested, the first selection device sends data received from the mobile station via the base stations to the second selection device without performing the selective combination.

Preferably, the first selection device is a drift radio network control device (D-RNC), and the second selection device is a serving radio network control device (S-RNC).

In the mobile communication system of the present invention, a setting unit variably sets an operation threshold value, and a selective combination instruction unit instructs a selective combination unit of the first selection device to perform the selective combination when a numerical value that indicates the congestion state of the line is greater than the operation threshold value, and instructs the selective combination unit to not perform selective combination when the numerical value is less than the operation threshold value.

Moreover, in the mobile communication system of the present invention, a setting unit sets a first operation threshold value and a second operation threshold value that is less than the first operation threshold value, and a selective combination instruction unit instructs a selective combination unit of the first selection device to perform selective combination when a numerical value that indicates the congestion station of the line is greater than the first operation threshold value, and instructs the selective combination unit to not perform selective combination when the numerical value is less than the second operation threshold value.

The selective combination unit controls for each mobile station whether or not to perform the selective combination based on the congestion state of the line between the D-RNC and S-RNC. For example, the selective combination unit monitors the amount of flow on the line for each mobile station, and based on that amount of flow, controls whether or not to perform the selective combination for each mobile station. Alternatively, the selective combination unit monitors for each mobile station the multiplicity of the data that is received from the base stations, and based on that multiplicity, controls of whether or not to perform the selective combination. Also, a missing data monitoring unit of the S-RNC can monitor for each mobile station, a degree of the missing data that is received from base stations, and notify the D-RNC, and based on that degree of the missing data, the D-RNC can control for each mobile station whether or not the selective combination unit performs the selective combination of the data.

DESCRIPTION OF THE PREFERRED EMBODIMENTS (A) First Embodiment

Figure 1:
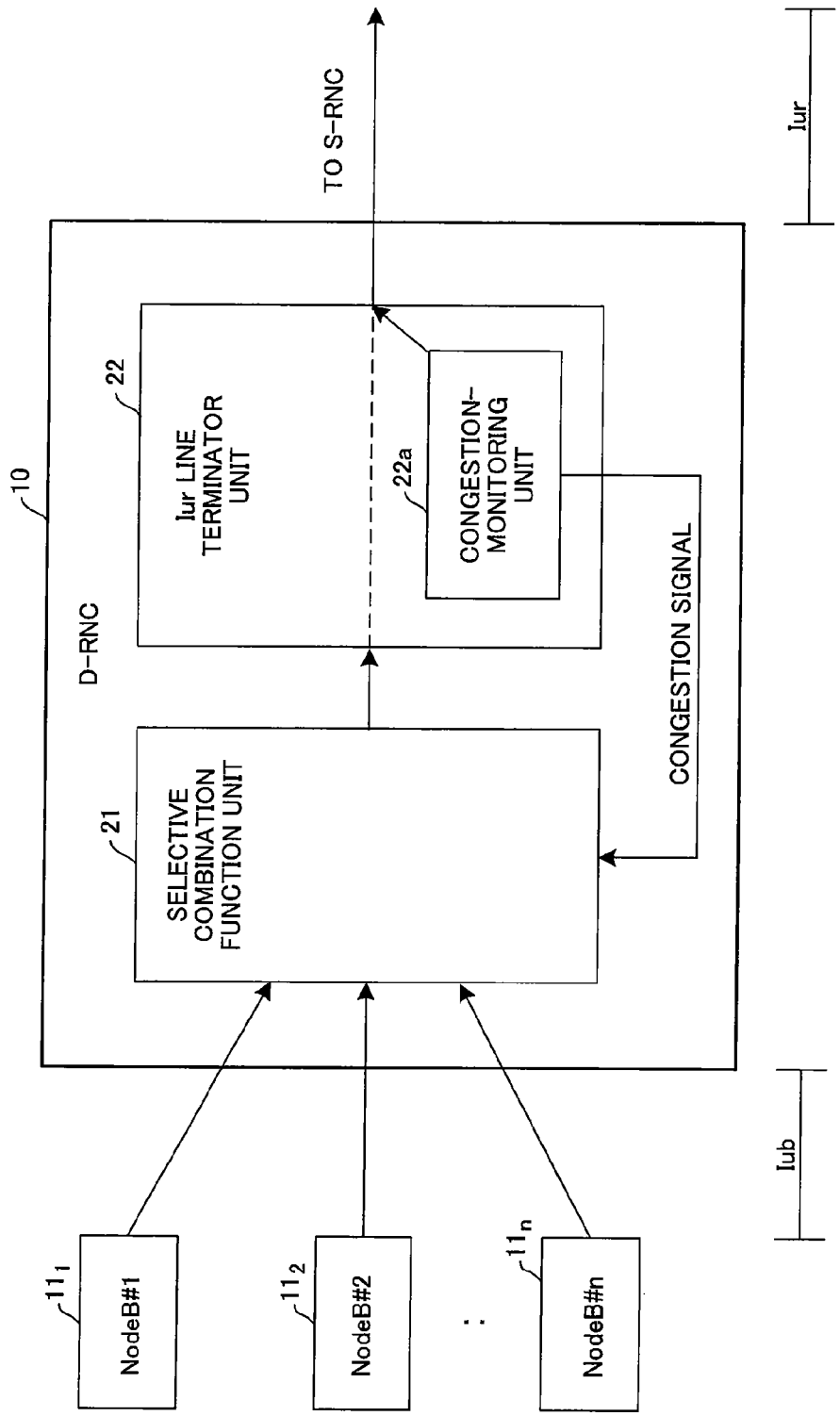
FIG. 1 is a schematic diagram of the main parts of a drift RNC (D-RNC) of a first embodiment of the present invention.
Figure 16:
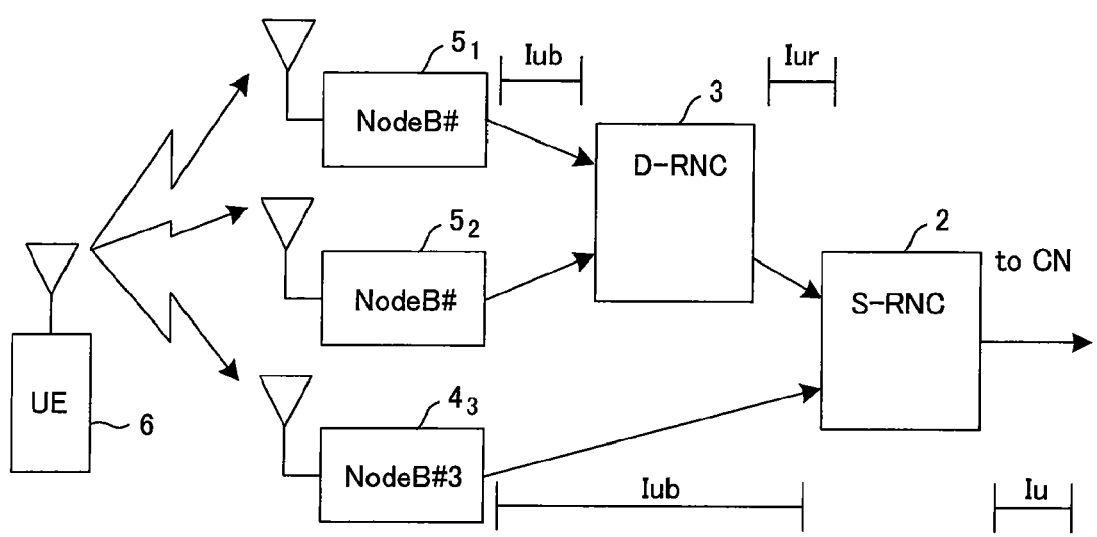
FIG. 16 is a drawing explaining a transmission path in which there is D-RNC.

FIG. 1 is a schematic diagram showing the main parts of a drift RNC (D-RNC) of a first embodiment of the present invention, and as shown in FIG. 16, presumes that copied data from a mobile station (not limited to one mobile station) are inputted from a plurality of base stations and transmitted to a S-RNC via that D-RNC. In the example, the D-RNC is a first selection unit and the S-RNC is a second selection unit, however, the invention is not limited to this.

In FIG. 1, a plurality of base stations $11_1$ to $11_n$ that are subordinate to the D-RNC are connected to the input side in the uplink direction of the D-RNC via an Iub interface, and a serving RNC (S-RNC) (not shown in the figure) is connected to the output side in the uplink direction via an Iur interface. A selective combination function unit 21 and an Iur line terminator unit 22 that controls the signal of the Iur line that connects D-RNC and S-RNC is provided in the D-RNC. The selective combination function unit 21 can take on two operating states, a first operating state in which selective combination is performed, and a second operating state in which selective combination is not performed; wherein in the second operating state in which the selective combination is not performed, the selective combination function unit 21 multiplexes copied data from each of the mobile stations that are inputted from the base stations $11_1$ to $11_n$, and sends the multiplexed data to the S-RNC via the Iur line terminator unit 22. Moreover, in the first state in which selective combination is performed, the selective combination function unit 21 selectively combines the copied data from each of the mobile stations that are inputted from the base stations $11_1$ to $11_n$ for each mobile station, and sends the combined signal to S-RNC via the Iur line terminator unit 22.

A congestion-monitoring unit 22*a* that monitors the amount of signals that are transmitted in the direction of the S-RNC and monitors the congestion status based on the amount of those transmission signals is provided in the Iur line terminator unit 22, and that congestion-monitoring unit 22*a* notifies the selective combination function unit 21 of the monitoring result. There are two feasible methods that can be used for the form of the congestion signal; a signal that quantifies the congestion status, or a signal (logical value) that directly indicates whether or not selective combination should be performed.

The selective combination function unit 21 performs selective combination, or does not perform selective combination based on the congestion signal that is inputted from the congestion-monitoring unit 22*a*. In other words, in a congested state in which the amount of transmission signals is large, the operating state is such that selective combination is performed, and in a non-congested state in which the amount of transmission signals is small, the operating state is such that selective combination is not performed.

In the first embodiment described above, when the Iur line between the D-RNC and S-RNC is congested, the D-RNC performs selective combination of the copied data that are inputted via a plurality of branches and sends the result to that Iur line, and when that Iur line is not congested, the D-RNC sends data to that line without performing selective combination of the copied data that are inputted via a plurality of branches. As a result, with this first embodiment, it becomes possible to keep the amount of bandwidth of the Iur line that is used at the same time to a minimum while at the same time maintaining the transmission quality that is provided to the mobile station at a maximum level.

First Variation

Figure 2:
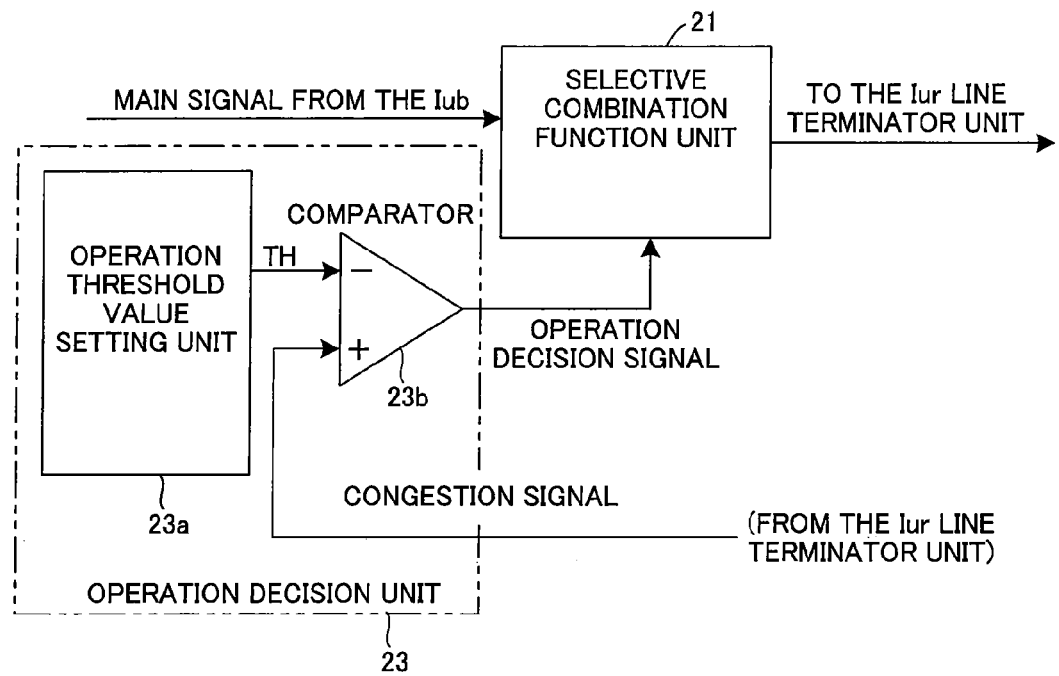
FIG. 2 is a first schematic diagram of the main parts of a D-RNC that comprises an operation decision unit that decides the operation of a selective combination function unit.

FIG. 2 is a first schematic diagram of the main parts of a D-RNC that comprises an operation decision unit 23 that decides the operation of the selective combination function unit 21. When the congestion-monitoring unit 22*a* outputs a signal as the congestion signal that quantifies the congestion state, the operation decision unit 23 decides the operation of the selective combination function unit 21 according to the result of comparing that quantified congestion signal with a preset operation threshold value. Here, it is presumed that a quantified value is used as the congestion signal, For example, when taking the maximum allowable bandwidth of a line in question to be 100%, a value is used that expresses the actual amount of flow as a percentage of that maximum allowable bandwidth. It is also possible to change the operation threshold value as needed during operation.

In FIG. 2, an operation threshold value setting unit 23*a* of the operation decision unit 23 sets an operation threshold value TH for determining whether or not there is a congested state, and a comparator 23*b* compares the operation threshold value with the quantified congestion signal, and when the congestion signal≧operation threshold value TH, determines that there is a congested state, and inputs an operation decision signal to the selective combination function unit 21 that gives an instruction to perform selective combination, however, when the congestion signal< operation threshold value TH, determines that there is not a congested state, and inputs an operation decision signal to the selective combination function unit 21 that gives an instruction not to perform selective combination. The selective combination function unit 21 appropriately performs or does not perform selective combination based on the inputted operation setting signal.

In this first variation, an operation threshold value is provided, and a numerical value that indicates the congestion state of a line is compared with that operation threshold value to decide whether or not to perform selective combination, so when there is a change in the system operating conditions, such as a change in the maximum allowable bandwidth of a line, it is possible to immediately change to a system that corresponds to the new operating conditions by changing the operation threshold value TH.

Second Variation

Figure 3:
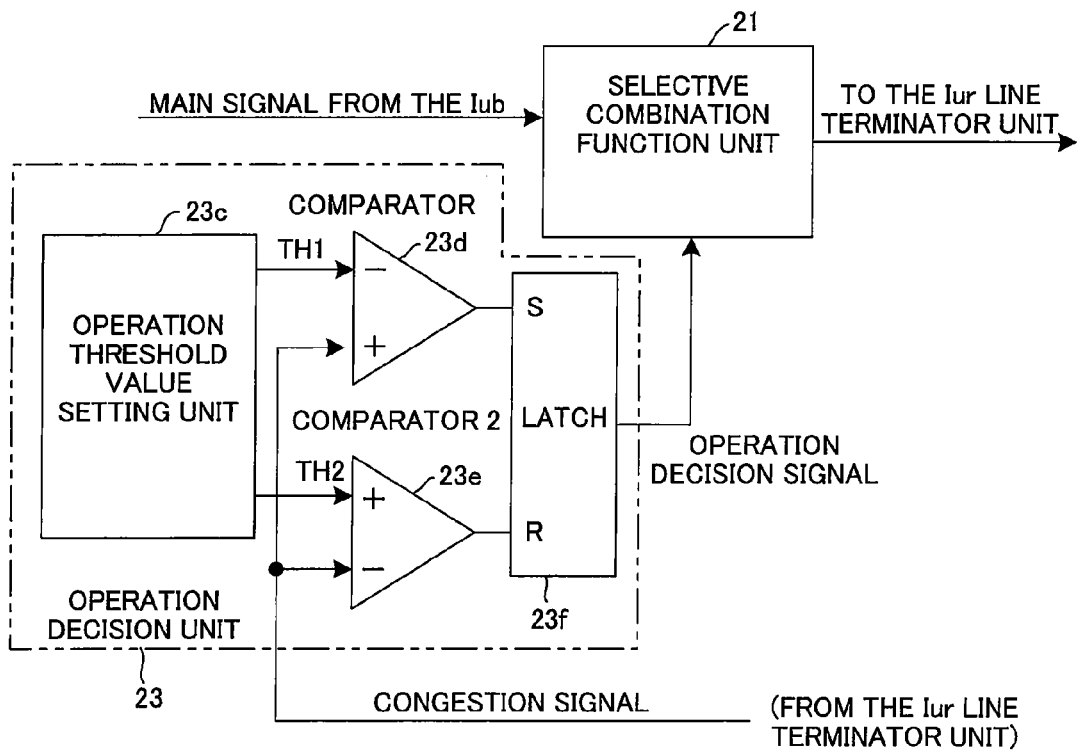
FIG. 3 is a second schematic diagram of the main parts of a D-RNC that comprises an operation decision unit that decides the operation of a selective combination function unit.

FIG. 3 is a second schematic diagram of the main parts of a D-RNC that comprises an operation decision unit 23 that decides the operation of the selective combination function unit 21. The first variation shown in FIG. 2 is a case in which one operation threshold value is provided, however, in this second variation, two operation threshold values are provided; a first operation threshold value TH1 and a second operation threshold value TH2 that is less than the first operation threshold value (TH2<TH1). The first operation threshold value TH1 is an operation threshold value that causes the operating state to change in the direction toward performing selective combination, and the second operation threshold value TH2 is an operation threshold value that causes the operating state to change in the direction toward not performing selective combination.

In FIG. 3, an operation threshold value setting unit 23*c* of the operation decision unit 23 sets the first and second operation threshold values TH1, TH2, then a first comparator 23*d* compares the first operation threshold value TH1 and a quantified congestion signal, and when the congestion signal≧first operation threshold value TH1, determines that there is a congested state and sets a latch circuit 23*f*. The latch circuit 23*f*, after being set, inputs an operation decision signal to the selective combination function unit 21 that instructs the selective combination function unit 21 to perform selective combination. Also, a second comparator 23*e* compares the second operation threshold value TH2 and the quantified congestion signal, and when the congestion signal≦second operation threshold value TH2, determines that there is a non-congested state and resets the latch circuit 23*f*. The latch circuit 23*f*, after being reset, inputs an operation setting signal to the selective combination function unit 21 that instructs the selective combination function unit 21 not to perform selective combination. The selective combination function unit 21 suitably performs or does not perform selective combination based on the inputted operation decision signal. In other words, the selective combination function unit 21:

1) changes the operating state to perform selective combination when the congestion signal≧first operation threshold value TH1;

2) maintains the previous operating state when the second operation threshold value TH2< congestion signal< first operation threshold value TH1; and 3) changes the operating state to not perform selective combination when the congestion signal≦second operation threshold value TH2.

In this second variation, a first operation threshold value and a second operation threshold value that is less than the first operation threshold value are provided, and when a numerical vale that indicates the congestion state of the Iur line is larger than the first operation threshold value, control is performed to perform selective combination, and when that numerical value is less than the second operation threshold value, control is performed to not perform selective combination, so it is possible to improve the control stability of the control by eliminating the divergence of the control.

(B) Second Embodiment

In the first embodiment, control is performed so that the selective combination function unit 21 performs or does not perform selective combination depending on whether or not the Iur line is in a congested state, however, it is possible for the selective combination function unit 21 to perform control to perform or not perform selective combination for each mobile station.

Figure 4:
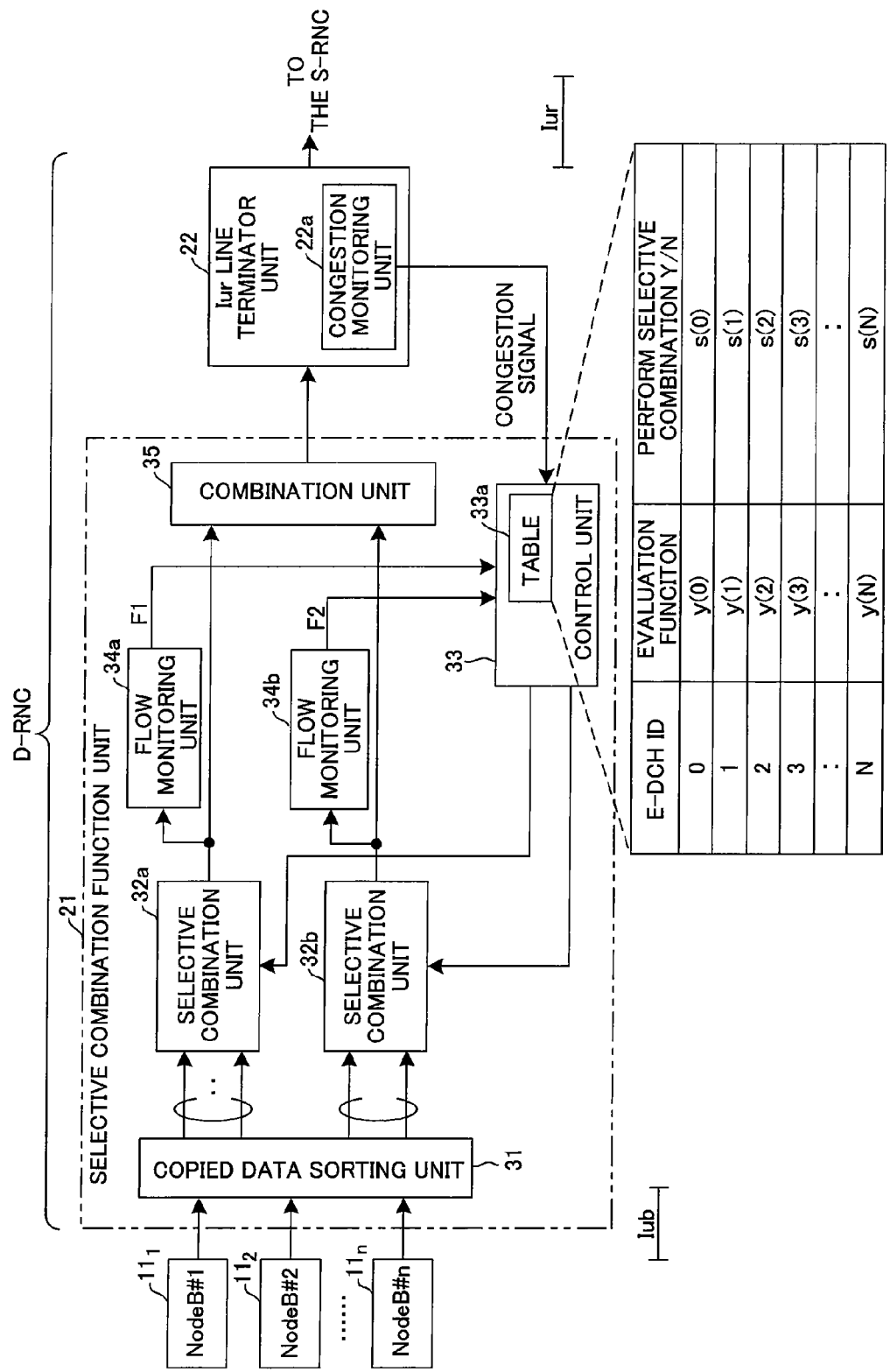
FIG. 4 is a schematic diagram of the main parts of a second embodiment of a D-RNC that controls whether to perform or not perform the selective combination for each E-DCH (mobile station) that the D-RNC accommodates.

FIG. 4 is a schematic diagram of the main parts of a D-RNC of a second embodiment of the present invention in which control is performed for each E-DHC (mobile station) that is accommodated by the D-RNC to perform or not perform selective combination, where the same reference numbers are assigned to parts that are the same as the parts in the first embodiment shown in FIG. 1. In the selective combination function unit 21, a copied data sorting unit 31 sorts copied data, which were inputted from the base stations $11_1$ to $11_n$ via the Iub interface, for each mobile station, and inputs the result to corresponding selective combination units 32a, 32b. The figure shows an example of sorting the copied data for two mobile stations, however, the number of mobile stations is not limited to two.

According to individual instructions from a control unit 33, the selective combination units 32a, 32b can each take on two operating states; a first operating state of performing selective combination, and a second operating state of not performing selective combination. The selective combination unit 32a: (1) multiplexes and outputs copied data from a first mobile station that were inputted from the base stations $11_1$ to $11_n$ in the second operating state in which selective combination is not performed, and (2) selectively combines copied data from the first mobile station that were inputted from the base stations and outputs the selectively combined signal in the first operating state in which selective combination is performed. More specifically, the selective combination unit 32a separates each of the inputted copied data (E-DCH Iub frame) into data (MAC-es PDU data) for the MAC-es layer. Similarly, the selective combination unit 32b: (1) multiplexes and outputs copied data from a second mobile station that were inputted from the base stations $11_1$ to $11_n$ in the second operating state in which selective combination is not performed, and (2) selectively combines copied data (E-DCH Iub frame) from the second mobile station that were inputted from the base stations and outputs the selectively combined signal in the first operating state in which selective combination is performed.

A flow monitoring unit 34a measures the amount of flow per a specified time of MAC-es PDU data that are sent from the selective combination unit 32a, and inputs the measurement result F1 to the control unit 33. Similarly, a flow monitoring unit 34b measures the amount of flow per a specified time of MAC-es PDU data that are sent from the selective combination unit 32b, and inputs the measurement result F2 to the control unit 33.

A combination unit 35 multiplexes time-divisionally the MAC-es PDU data that are inputted from each of the selective combination units 32a, 32b, and sends the result to the S-RNC via the Iur line terminator unit 22. A congestion monitor unit 22a, which measures the amount of transmission signals sent in the direction toward the S-RNC and monitors the congestion state based on the amount of those signals, is provided inside the Iur line terminator unit 22a, and the congestion monitor 22a notifies the control unit 33 in the selective combination function unit 21 of the monitoring result by way of a congestion signal. Two methods are feasible as the form of the congestion signal; a signal that quantifies the congestion state, or a signal (logical value) that directly indicates whether or not to perform selective combination, however, here it is presumed that the congestion signal directly indicates whether or not to perform selective combination.

When the Iur line is not in a congested state and the congestion signal that is inputted from the congestion monitoring unit 22a indicates not to perform selective combination, the control unit 33 instructs the selective combination units 32a, 32b to not perform selective combination regardless of the amount of flow F1, F2 that is inputted from the flow monitoring units 34a, 34b. By doing so, the selective combination unit 32a multiplexes and outputs the copied data from the first mobile station that are inputted from the base stations $11_1$ to $11_n$ without performing selective combination, and similarly, the selective combination unit 32b multiplexes and outputs the copied data from the second mobile station that are inputted from the base stations $11_1$ to $11_n$ without performing selective combination.

On the other hand, when the Iur line is in a congested state and the congestion signal that is inputted from the congestion monitoring unit 22a indicates to perform selective combination, the control unit 33 references the amount of flow F1, F2 that is inputted from the flow monitoring units 34a, 34b, and instructs a selective combination unit having an amount of flow that is greater than a set value, for example, instructs selective combination unit 32a to perform selective combination, and instructs a selective combination unit having an amount of flow that is less than a set value, for example, instructs selective combination unit 32b to not perform selective combination. By so doing, the selective combination unit 32a selectively combines and outputs the copied data from the first mobile station that is inputted from the base stations $11_1$ to $11_n$, and the selective combination unit 32b multiplexes and outputs the copied data from the second mobile station that are inputted from the base stations $11_1$ to $11_n$ without performing selective combination. By performing selective combination, the amount of data that is sent from the selective combination unit 32a is reduced, which alleviates the congested state.

The control unit 33 comprises a table 33a that contains evaluation function values y(i) and data x(i) for indicating whether or not to perform selective combination for each mobile station (E-DCH ID), and when the congestion signal indicates that selective combination is to be performed, the control unit 33 references this table 33a and instructs the selective combination units 32a, 32b to perform or not perform selective combination. In other words, the amounts of flow F1, F2 that are sent from the flow monitoring units 34a, 34b are recorded in the table 33a as the evaluation function values y(i) (i=0, 1), and when an evaluation function value y(i) is greater than a set value, high-level "1" is recorded in the table 33a as the data s(i)=0, 1) for indicating to perform selective combination, and when the evaluation function value y(i) is less than a set value, low-level "0" is recorded in the table 33a for indicating to not perform selective combination. When the congestion signal indicates to perform selective combination, the control unit 33 references the table 33a and searches for mobile stations whose s(i) (i=0, 1) value is high-level "1", and then instructs the selective combination units that correspond to those mobile stations to perform selective combination, and instructs mobile stations whose s(i)=0, 1) value is low-level "0" to not perform selective combination.

Using a specified evaluation function y, it is possible to calculate y(i) from a notified amount of flow, and then to use that function value y(i) together with a specified algorithm to decide data s(i) for indicating whether or not to perform selective combination. Moreover, in the explanation above, selective combination units having an amount of flow that is greater than a set value were instructed to perform selective combination, however, construction is also possible in which only the selective combination unit having the largest amount of flow is instructed to perform selective combination. Furthermore, in the explanation above, the amount of flow was measured, however, it is also possible to use a set bandwidth that is assigned to the mobile stations from the host at the start of communication.

In the second embodiment described above, selective combination is performed for the copied data from a mobile station that has a large effect on the congestion state of the Iur line (mobile station having a large amount of copied data), and selective combination is not performed for the copied data from a mobile station that has little effect on the congestion state of the Iur line (mobile station having small amount of copied data). As a result, with this second embodiment of the invention it is possible to keep the number of mobile stations whose transmission quality could drop to a minimum.

In addition, with this second embodiment, whether or not to perform selective combination is controlled for each mobile station, so it is possible to improve transmission quality and keep traffic on the Iur line low.

(C) Third Embodiment

Figure 5:
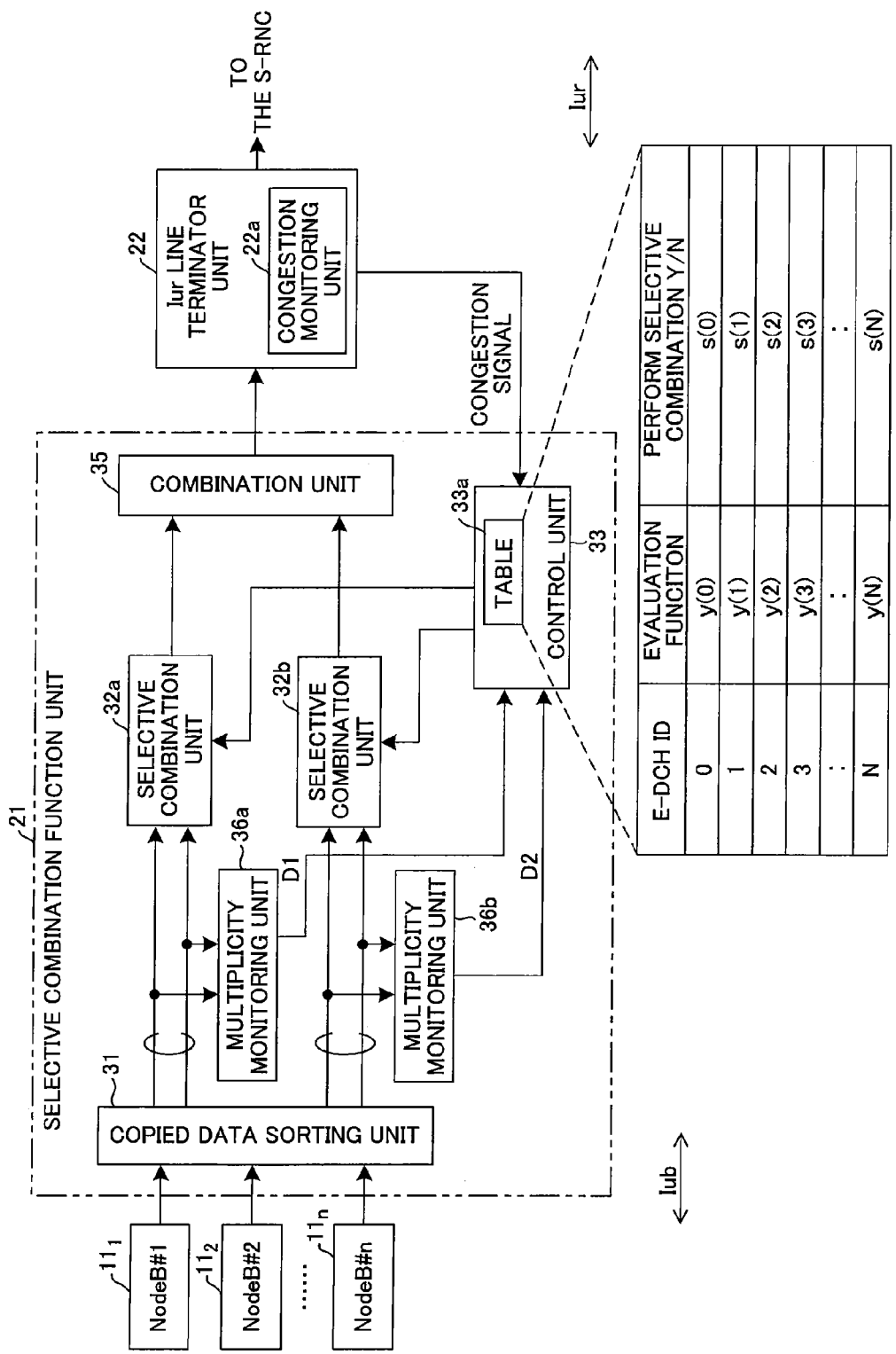
FIG. 5 is a schematic diagram of the main parts of a third embodiment of a D-RNC that controls for each mobile station whether to perform or not perform the selective combination.

FIG. 5 is a schematic diagram of the main parts of a D-RNC of a another embodiment (third embodiment) that controls for each mobile station whether to perform or not perform selective combination, where the same reference numbers are given to parts that are the same as those of the second embodiment shown in FIG. 4. This embodiment differs from the second embodiment in that multiplicity monitoring units 36a, 36b are provided instead of the flow monitoring units, and the multiplicity of the copied data is monitored for each mobile station, then the control unit 33 controls for each mobile station whether or not to perform selective combination based on the multiplicity.

A copied data sorting unit 31 sorts copied data that is inputted from the base stations $11_1$ to $11_n$ via the Iub interface for each of the mobile stations, and inputs that data to the corresponding selective combination units 32a, 32b and multiplicity monitoring units 36a, 36b. The selective combination units 32a, 32b, combination unit 35 and Iur line terminator unit 22 operate in the same way as in the second embodiment, and send a combined signal to the S-RNC.

Calculation of the multiplicity is possible by referencing the TSN number that is attached to the MAC-es PDU data in the E-DCH data frame that arrives from the Iub side, and calculating the number of MAC-es PDU data that redundantly arrives from each branch. More specifically, when MAC-es PDU data having a specified TSN arrives from a branch, and MAC-es PDU data having the same TSN as that TSN arrives from another branch within a preset period of time, this MAC-es PDU data is regarded as being received multiplicity. In addition, the number of MAC-es PDU data that is regarded as being redundantly received within the set period of time is accumulatively added, and that accumulatively added value is used as the redundancy. The method of accumulative addition could be a method of accumulatively adding the number of MAC-es PDU data, or could be a method of accumulatively adding the amount of data of the MAC-es PDU data.

Figure 6:
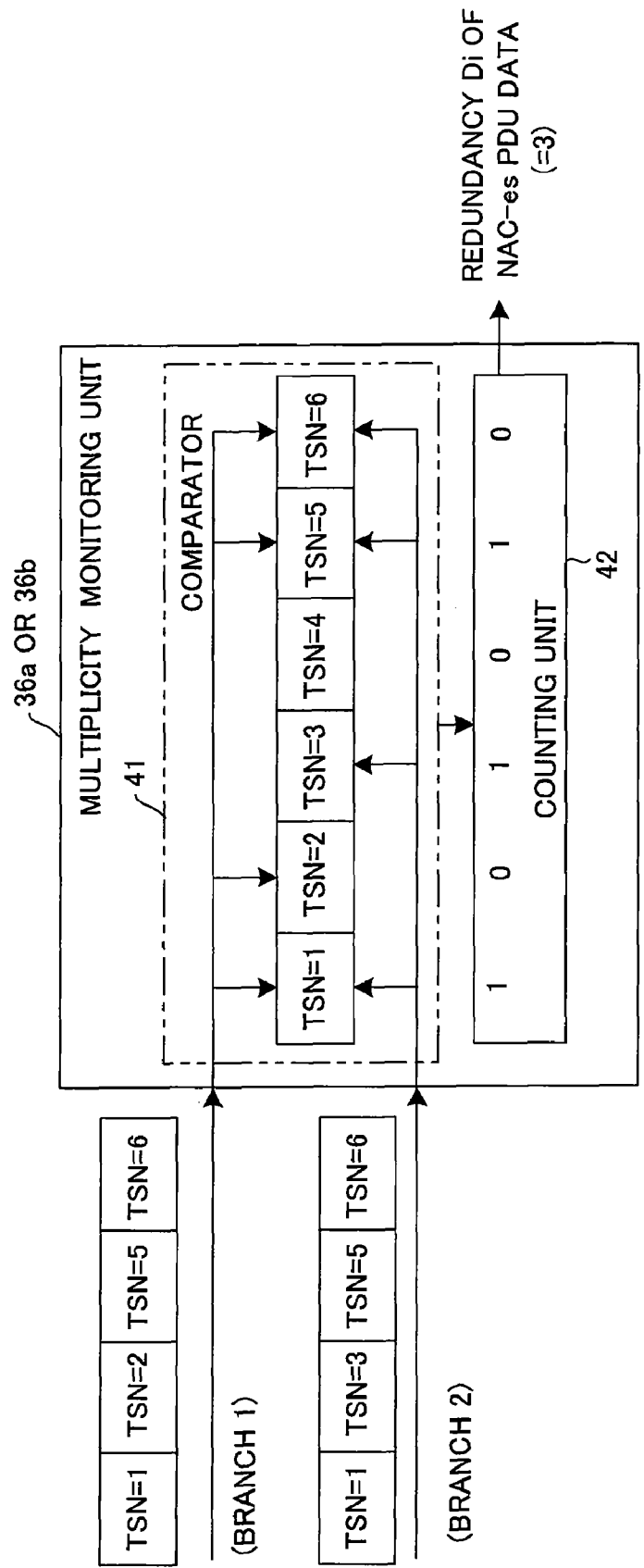
FIG. 6 is a schematic diagram of a multiplicity monitoring unit.

FIG. 6 is a schematic diagram of the multiplicity monitoring units 36a, 36b, where a comparator 41 checks whether MAC-es PDU data having identical TSN have been redundantly received from two branches within a unit period of time, and a counting unit 42 counts the number of redundantly received MAC-es PDU data and inputs that count value to the control unit 33 as the multiplicity Di. FIG. 6 shows the state in which four MAC-es PDU data are received from each of the two branches within a set period of time, and of these, three of the MAC-es PDU data are regarded as being redundant (multiplicity=3).

The congestion monitoring unit 22a operates in the same way as in the second embodiment and inputs a congestion signal to the control unit 33. When the Iur line is not in a congested state and the congestion signal that is inputted from the congestion monitoring unit 22a indicates to not perform selective combination, the control unit 33 instructs each of the selective combination unit 32a, 32b to not perform selective combination regardless of the multiplicity D1, D2 that is inputted from the multiplicity monitoring units 36a, 36b. By doing so, the selective combination unit 32a simply multiplexes and outputs the copied data from a first mobile station that is inputted from the base stations $11_1$ to $11_n$ without performing selective combination, and similarly the selective combination unit 32b simply multiplexes and outputs the copied data from a second mobile station that is inputted from the base stations $11_1$ to $11_n$ without performing selective combination.

On the other hand, when the Iur line is in a congested state and the congestion signal that is inputted from the congestion monitoring unit 22a indicates to perform selective combination, the control unit 33 references the redundancy D1, D2 that is inputted from the multiplicity monitoring units 36a, 36b, then instructs selective combination units having a multiplicity that is greater than a set value, for example, the selective combination unit 32a, to perform selective combination, and instructs selective combination units having a multiplicity that is less than a set value, for example, the selective combination unit 32b, to not perform selective combination. In doing so, the selective combination unit 32a selectively combines and outputs the copied data from the first mobile station that are inputted from the base stations $11_1$ to $11_n$, and the selective combination unit 32b multiplexes and outputs the copied data from the second mobile station that are inputted from the base stations $11_1$ to $11_n$ without performing selective combination. By performing selective combination, the amount of data that are transmitted from the selective combination unit 32a is reduced, which alleviates the congested state.

The control unit 33 comprises a table 33a that contains evaluation function values y(i) and data s(i), which indicates whether or not to perform selective combination, for each mobile station (E-DCH), and when the congestion signal indicates to perform selective combination, the control unit 33 references this table and instructs the selective combination units 32a, 32b whether or not to perform selective combination. In other words, multiplicity values D1, D2 that are inputted from the multiplicity monitoring units 36a, 36b are recorded in the table 33a as the evaluation function values y(i)=0, 1), and when the evaluation function value y(i) is greater than a set value, high-level "1" is recorded as the data s(i) that indicates to perform selective combination, and when the evaluation function value y(i) is less than a set value, low-level "0" is recorded as data s(i) that indicates to not perform selective combination. When the congestion signal indicates to perform selective combination, the control unit 33 references the table 33a, searches for mobile stations having s(i) (i=0, 1) that is high-level "1", then instructs the selective combination units corresponding to those mobile stations to perform selective combination, and instructs the selective combination units corresponding to the mobile stations having s(i)=0, 1) that is low-level "0" to not perform selective combination.

In the third embodiment described above, the copied data that are received from the base stations are monitored for each mobile station for multiplicity, and control is performed for each mobile station based on the multiplicity of whether or not to perform selective combination, so it is possible to effectively reduce redundant traffic that flows over the Iur line, and to keep the effect on the lowering of transmission quality for each mobile station low.

Moreover, with this third embodiment, control is performed for each mobile station of whether or not to perform selective combination, so it is possible to improve transmission quality and to keep the traffic on the Iur line even lower.

(D) Fourth Embodiment

Figure 7:
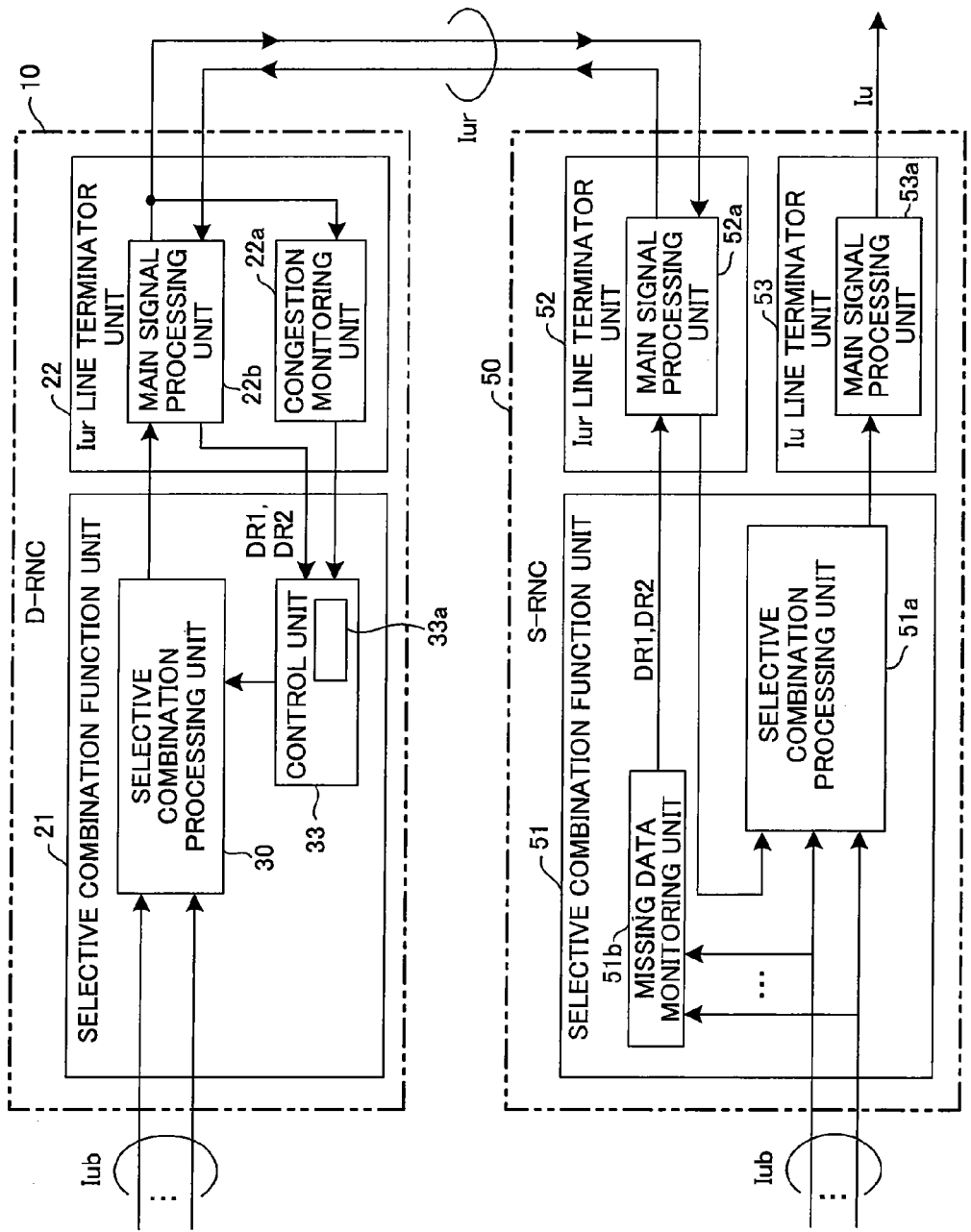
FIG. 7 is a schematic diagram of a fourth embodiment of a D-RNC that controls for each mobile station whether to perform or not perform the selective combination.

FIG. 7 is a schematic diagram of the main parts of a D-RNC and S-RNC of a fourth embodiment that performs control for each mobile station of whether or not to perform selective combination, where the same reference numbers are assigned to parts that are the same as those of the second embodiment. In this fourth embodiment, the S-RNC 50 monitors the missing copied data for each mobile station and notifies the D-RNC 10 of that missing data information, then the D-RNC 10 performs control for each mobile station based on that missing data information of whether or not to perform selective combination.

Figure 8:
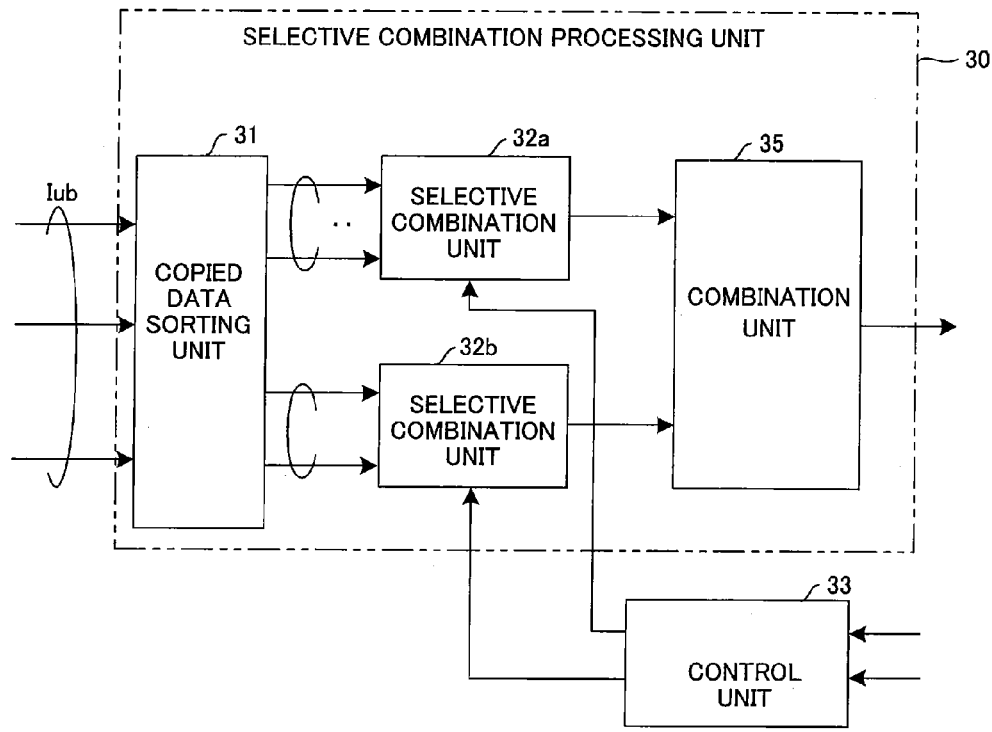
FIG. 8 is a schematic diagram of a selective combination processing unit.

In the D-RNC 10, a selective combination processing unit 30 of a selective combination function unit 21 comprises: a copied data sorting unit 31, selective combination unit 32a, 32b and a combination unit 35 as in the case of the second embodiment shown in FIG. 8, and the selective combination units 32a, 32b perform the selective combination process according to an instruction from the control unit 33. A main signal processing unit 22b of the Iur line terminator unit 22 performs Iur interface processing for a signal that is outputted from the selective combination processing unit 30 and sends that result to the S-RNC 50, as well as receives the missing data information that is inputted from the S-RNC 50 and inputs that missing data information to the control unit 33.

In the S-RNC 50, a selective combination processing unit 51a of the selective combination function unit 51 performs selective combination of copied data that is inputted from a mobile station via one or more Iub line and copied data that are inputted from the D-RNC via an Iur line, and inputs the result to an Iu line terminator unit 53. A main signal processing unit 53a of the Iu line terminator unit 53 performs Iu interface processing on the inputted signal and sends the result to the core network. In addition, a missing data monitoring unit 51b in the selective combination function unit 51 monitors missing copied data for each mobile station, and notifies the D-RNC 10 of the missing data DR1, DR2 for each mobile station via the main signal processing unit 52a of the Iur line terminator unit 52.

Calculation of the missing data is possible by referencing the TSN that is attached to the MAC-es PDU data in an E-DCH Iub frame that arrives from the Iub side, and calculating the number of MAC-es PDU data that do not arrive from any of the branches. More specifically, when MAC-es data having a specified TSN does not arrive from any of the branches within a preset period of time, that MAC-es PDU data is considered to be missing. Moreover, the number of MAC-es PDU data that were not received within a set period of time is accumulatively added for each mobile station, and the accumulated values DR1, DR2 for each mobile station are used as the missing data information.

Figure 9:
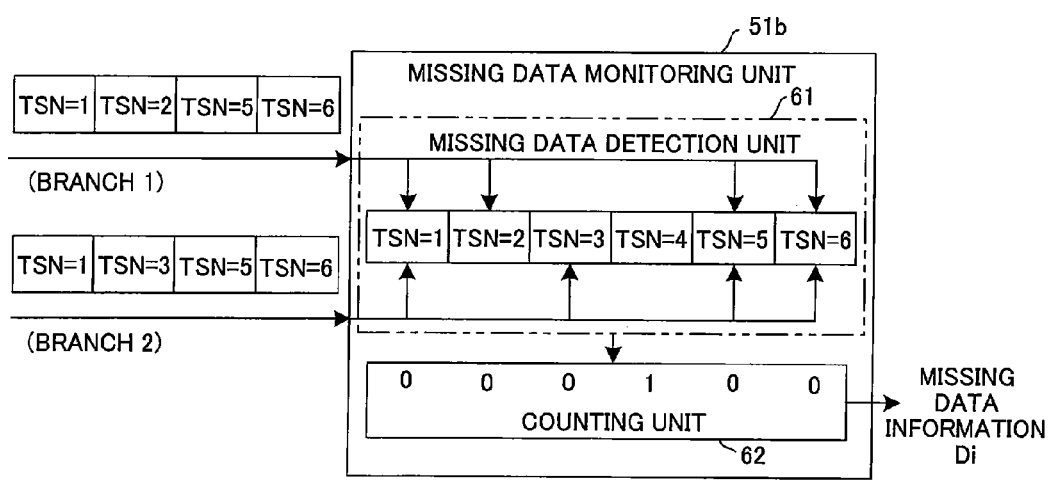
FIG. 9 is a schematic diagram of a missing data monitoring unit.
Figure 10:
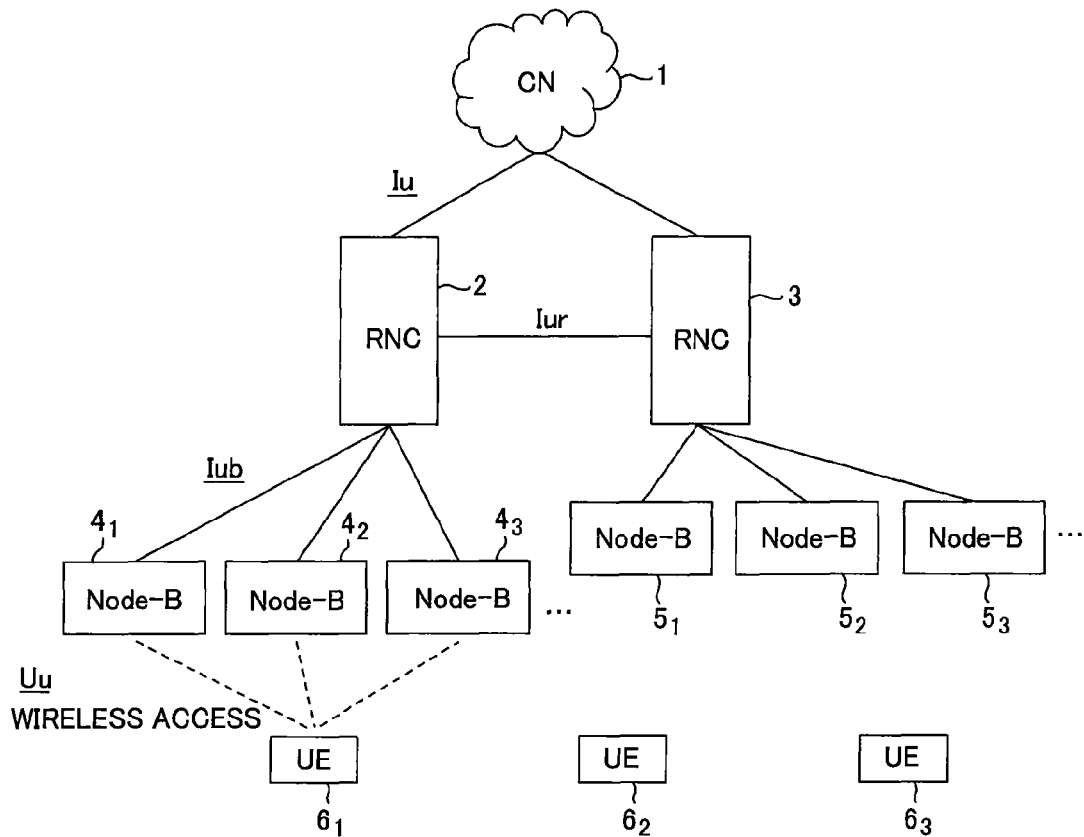
FIG. 10 is a schematic diagram of a W-CDMA mobile communication system.
Figure 11:
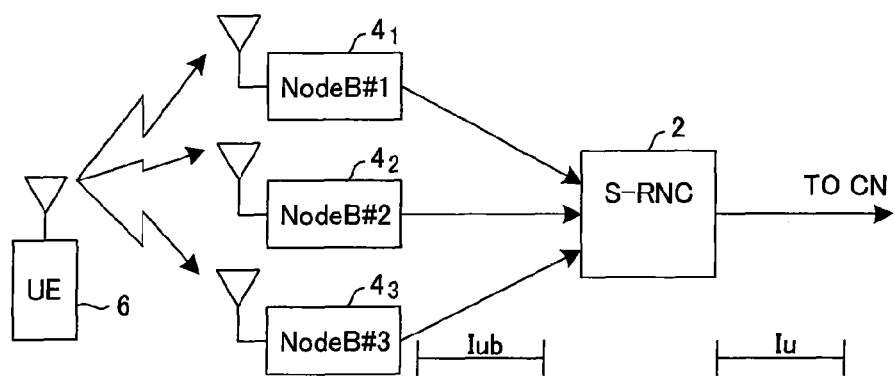
FIG. 11 is a drawing explaining the transmission path of uplink traffic (E-DCH) when HSUPA is applied to a standard W-CDMS system.
Figure 12:
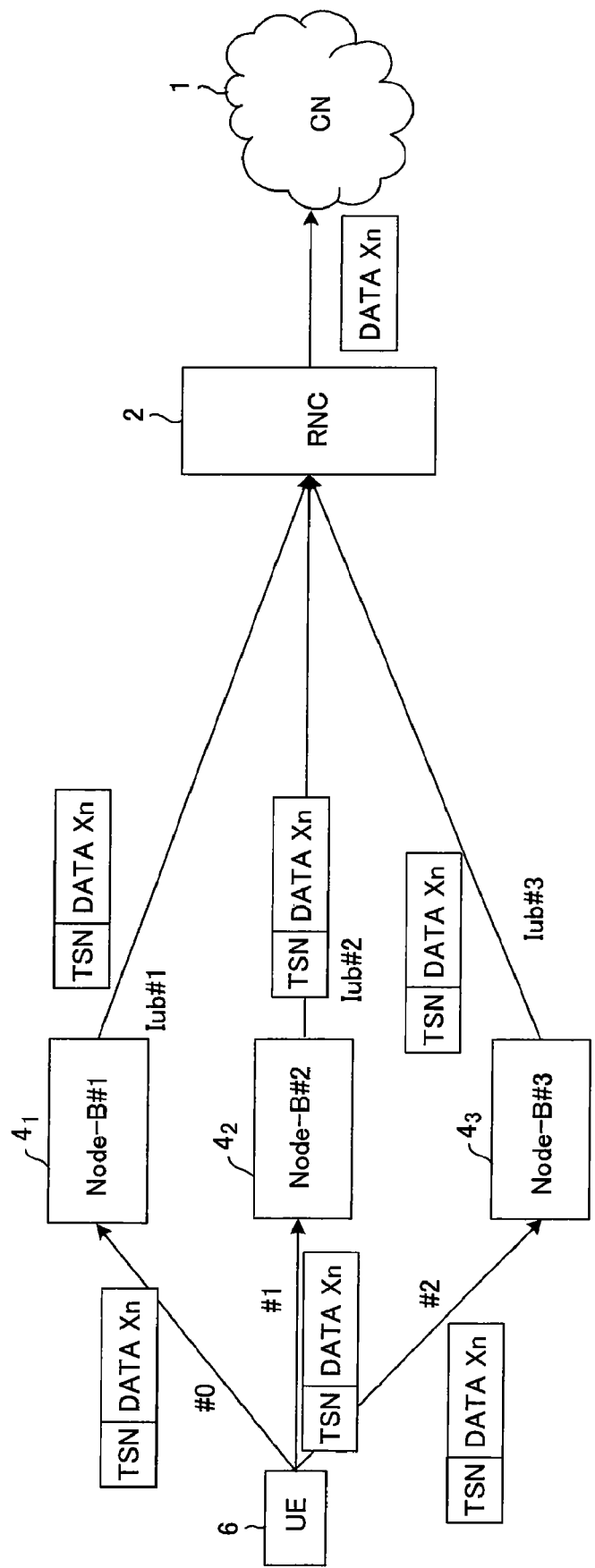
FIG. 12 is a drawing explaining a HSUPA transmission method that copies data Xn from a mobile station for several branches, attaches the same transmission sequence number TSN to each set of data Xn, and transmits the data to a RNC.
Figure 13:
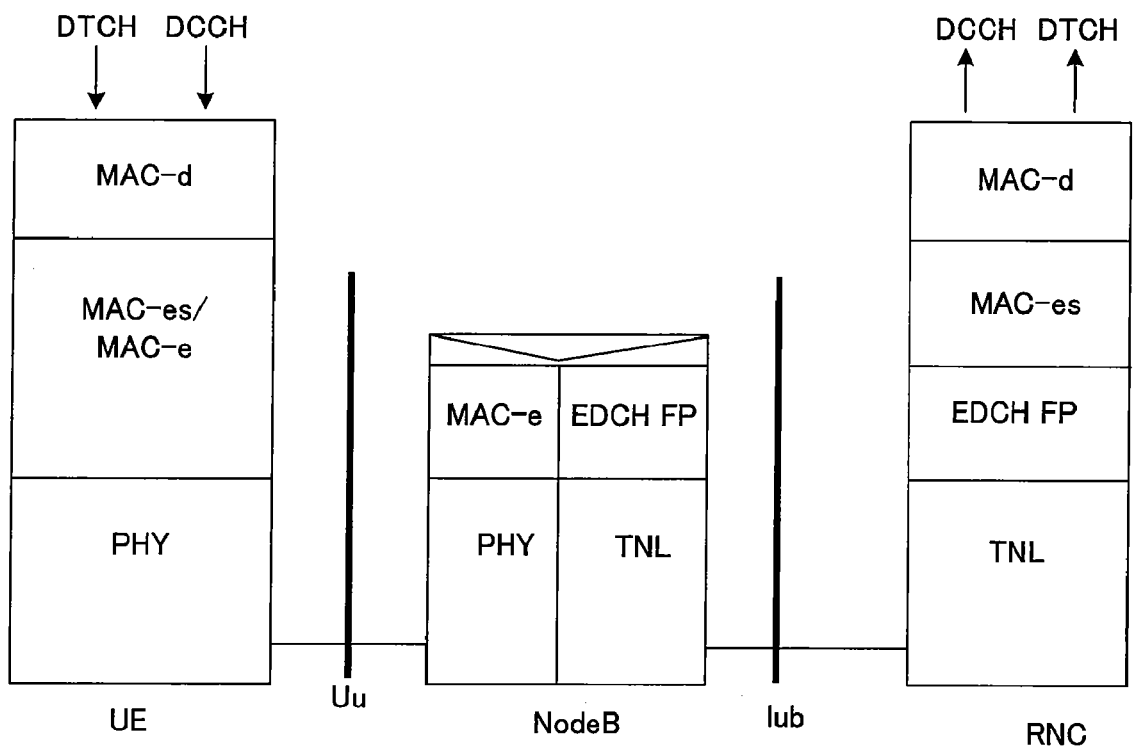
FIG. 13 is a layer configuration diagram (protocol stack) for each unit in the HSUPA method.
Figure 14:
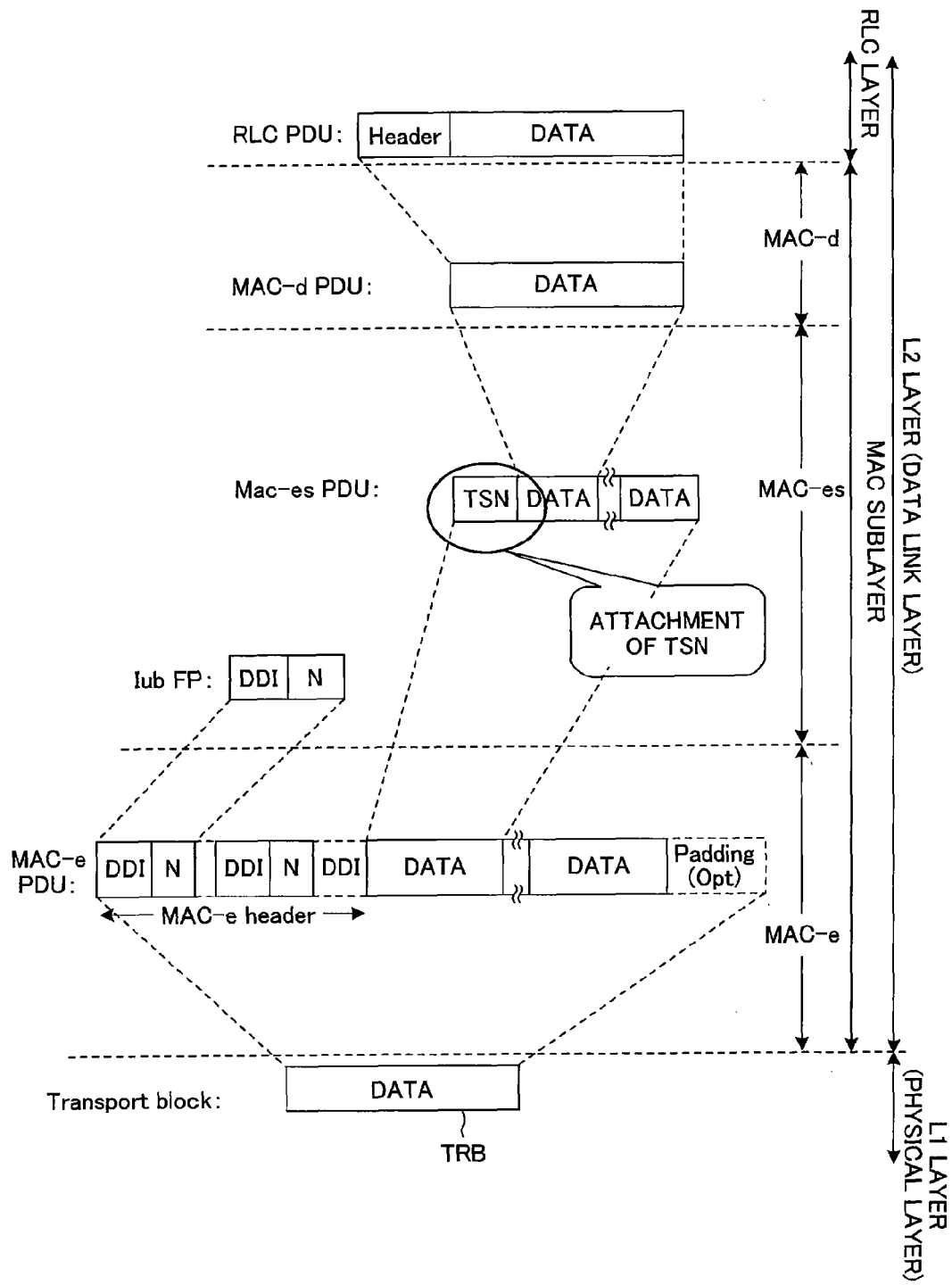
FIG. 14 is a drawing explaining the procedure for creating data TRB in a mobile station.
Figure 15:
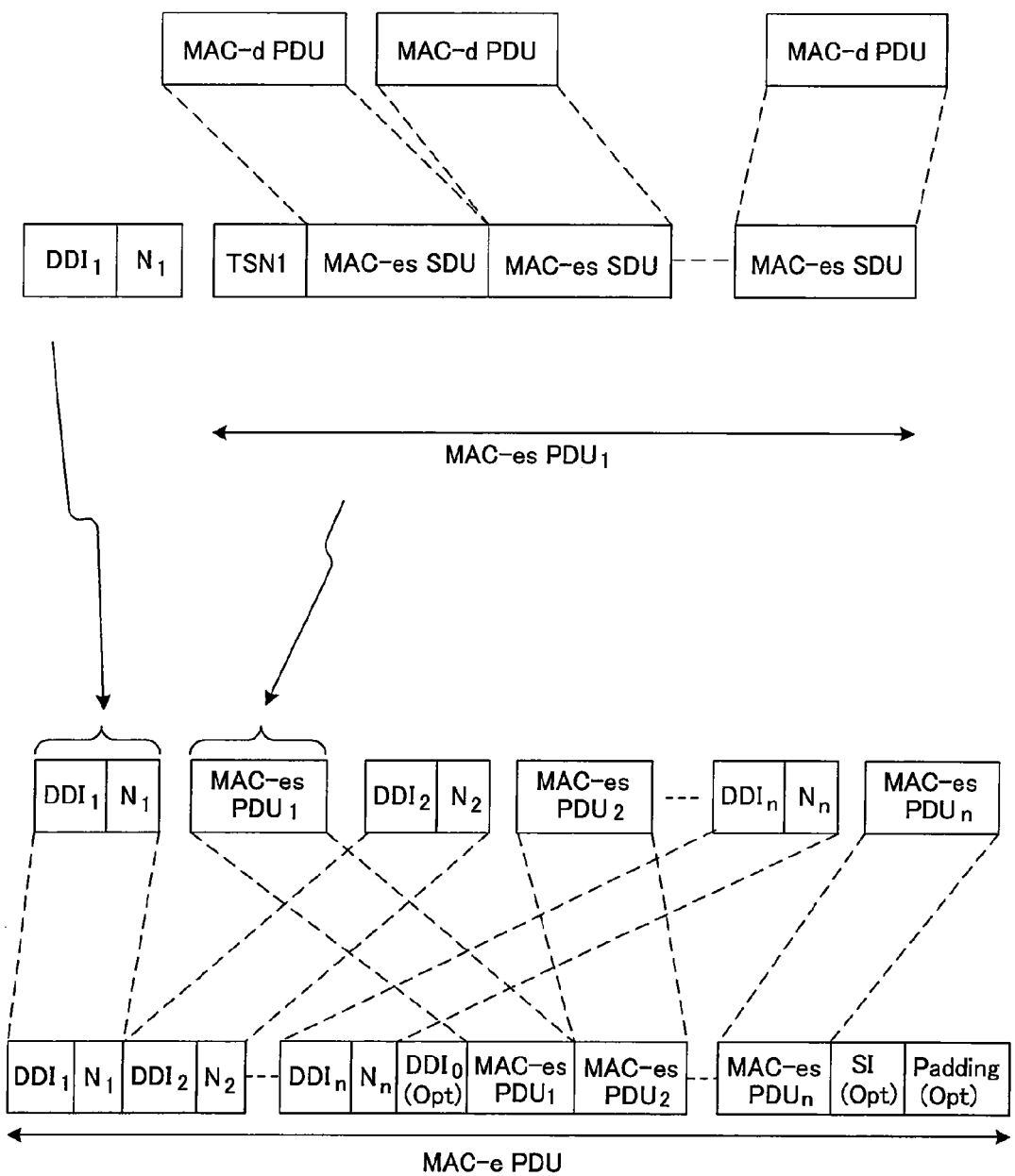
FIG. 15 is a drawing explaining the multiplexing relationship between MAC-d PDU data, MAC-es PDU data and MAC-e PDU data.

FIG. 9 is a schematic diagram of a missing data monitoring unit 51b, where a missing data detection unit 61 checks whether MAC-es PDU data having a specified TSN has been received from at least one branch during a unit period of time, and when no such data has arrived from any branch, inputs a count-up signal to a counting unit 62 indicating that that MAC-es PDU data is missing. The counting unit 62 counts the count-up signal and sends the number of MAC-es PDU data that were not received from any branch to the control unit 33 of the D-RNC as missing data information DRi. FIG. 9 shows the state in which four MAC-es PDU data are received from each of two branches, and of these, one MAC-es PDU data of which TSN is 4 is regarded to be missing.

A congestion monitoring unit 22a of the D-RNC operates similar to that in the second embodiment, and inputs a congestion signal to the control unit 33. When the Iur line is not in a congested state and the congestion signal that is inputted from the congestion monitoring unit 22a indicates to not perform selective combination, the control unit 33 instructs each of the selective combination unit 32a, 32b inside the selective combination processing unit 30 (see FIG. 8) to not perform selective combination regardless of the missing data information DR1, DR2. By doing so, the selective combination unit 32a, without performing selective combination, multiplexes and outputs the copied data from a first mobile station that are inputted from a plurality of branches via the Iub interface, and similarly, the selective combination unit 32b, without performing selective combination, multiplexes and outputs the copied data from a second mobile station that are inputted from a plurality of branches via the Iub interface.

On the other hand, when the Iur line is in a congested state and the congestion signal that is inputted from the congestion monitoring unit 22a indicates to perform selective combination, the control unit 33 references the missing data information DR1, DR2 that is inputted from the missing data monitoring unit 51b of the S-RNC and instructs selective combination units having missing data information that is less than a set value, for example, the selective combination unit 32a, to perform selective combination, and instructs selective combination units having missing data information that is greater than a set value, for example, the selective combination unit 32b, to not perform selective combination. By doing so, the selective combination unit 32a selectively combines and outputs the copied data from the first mobile station that are inputted from the base stations, and the selective combination unit 32b, without performing selective combination, multiplexes and outputs the copied data from the second mobile station that are inputted from the base stations. By performing selective combination, the amount of data that are sent from the selective combination unit 32a is reduced, which alleviates the congested state.

The control unit 33 comprises a table that contains evaluation function values y(i) and data s(i), which indicates whether or not to perform selective combination, for each mobile station (E-DCH ID), and when the congestion signal indicates to perform selective combination, the control unit 33 references this table and instructs the selective combination unit 32a, 32b whether or not to perform selective combination. In other words, the missing data information DRi that is sent from the missing data monitoring unit 51b is recorded in the table 33a as the evaluation function value y(i) (i=0, 1), and when the evaluation function value y(i) is greater than a set value, low-level "0" is recorded as the data s(i) (i=0, 1) that indicates to not perform selective combination, and when the evaluation function value y(i) is less than a set value, high-level "1" is recorded as the data s(i) that indicates to perform selective combination. When the congestion signal indicates to perform selective combination, the control unit 33 references the table 33a and searches for mobile stations whose data s(i) (i=0, 1) is high-level "1", then instructs the selective combination units that correspond to those mobile stations to perform selective combination, and instructs the selective combination units that correspond to the mobile stations whose data s(i)=0, 1) is low-level "0" to not perform selective combination.

With this fourth embodiment described above, the S-RNC monitors for missing copied data that is to be received from the base stations, and then based on that missing data information, the D-RNC performs control for each mobile station of whether or not to perform selective combination, so redundant traffic that flows over the Iur line can be effectively reduced, as well as the drop in transmission quality for each mobile station can be kept small.

As can be clearly seen from the explanation above, with the present invention it is possible to effectively use the bandwidth, while at the same time take into consideration the transmission quality that is provided to the mobile stations.

Effect of the Embodiments

With the embodiments explained above, when the line between the D-RNC and S-RNC is congested, the D-RNC selectively combines the copied data that are inputted from a plurality of base stations and transmits that combined data over that line, and when that line is not congested, the D-RNC sends the copied data that are inputted from a plurality of base stations to that line without performing selective combination, so the transmission quality that is provided to the mobile stations can be kept at a maximum, while at the same time the required line bandwidth used can be kept at a minimum.

Moreover, the D-RNC performs control for each mobile station of whether or not to perform selective combination, so transmission quality can be improved, or traffic on the Iur line can be kept even lower.

Furthermore, a variable operation threshold value is provided, and whether or not to perform selective combination is determined by comparing a numerical value that indicates the congested state of the line with the operation threshold value, so when there are changes in the operating conditions of the system, such as changes in the maximum allowable bandwidth of the Iur line, by changing the operation threshold value, the system can be immediately changed to a system that is more suitable to the operating conditions.

Also, a first operation threshold value and a second operation threshold value that is less than the first operation threshold value are provided, and control is performed such that selective combination is performed when a numerical value that indicates the congested state of the line is greater than the first operation threshold value, and selective combination is not performed when that numerical value is less than the second operation threshold value, so the divergence of the control operation can be eliminated, thus improving the stability of the control.

In addition, the copied data from a mobile station having a large effect on the congestion state of the Iur line is selectively combined, and selective combination is not performed for the copied data from a mobile station having a small effect on the congestion state of the Iur line, so the number of mobile stations having a possibility of a drop in transmission quality can be kept to a minimum.

Moreover, the multiplicity of the copied data that are received from base stations is monitored for each mobile station, and based on that multiplicity, control is performed for each mobile station of whether or not to perform selective combination, so redundant mobile station traffic that flows on the Iur line can be more effectively reduced, and on the drop in transmission quality for each mobile station can be kept low.

Furthermore, for each mobile station, the S-RNC monitors missing copied data that is to be received from the base stations, and then based on that missing data information, the D-RNC controls for each mobile station whether or not to perform selective combination, so redundant mobile station traffic that flows on the Iur line can be more effectively reduced, and on the drop in transmission quality for each mobile station can be kept low.

What is claimed is:

1. A communication method in a mobile communication system in which a plurality of base stations are capable of receiving data having the same contents from one mobile station, and a first and second selection devices are capable of performing selective combination of data that are received from a mobile station via the base stations and that have the same contents, the communication method comprising;
   monitoring in the first selection device whether the line between the first selection device and the second selection device is congested;
   when the line is congested, sending the result obtained by performing the selective combination of data received from the mobile station via the base stations, to the second selection device from the first selection device, and
   when the line is not congested, sending data received from the mobile station via the base stations, to the second selection device from the first selection device without performing the selective combination,
   wherein the communication method further comprising:
   controlling whether or not to perform the selective combination of the data for each mobile station based on the congestion state of the line and the controlling step includes:
   monitoring the amount of flow over the line for each mobile station; in the first selection device and
   based on that amount of flow, controlling whether or not to perform the selective combination for each mobile station.

2. A communication method in a mobile communication system in which a plurality of base stations are capable of receiving data having the same contents from one mobile station, and a first and second selection devices are capable of performing selective combination of data that are received from a mobile station via the base stations and that have the same contents, the communication method comprising;
   monitoring in the first selection device whether the line between the first selection device and the second selection device is congested;
   when the line is congested, sending the result obtained by performing the selective combination of data received from the mobile station via the base stations, to the second selection device from the first selection device, and
   when the line is not congested, sending data received from the mobile station via the base stations, to the second selection device from the first selection device without performing the selective combination, wherein the communication method further comprising:

controlling whether or not to perform the selective combination of the data for each mobile station based on the congestion state of the line and the controlling step includes:

monitoring for each mobile station the degree of the missing data that is received from base stations in the first selection device;

notifying the first selection device of the degree of the missing data; and based on the degree of the missing data, controlling for each mobile station whether or not to perform selective combination in the first selection device.

3. A radio network control device in a mobile communication system in which a plurality of base stations are capable of receiving data having the same contents from one mobile station, and a first and second radio network control devices are capable of performing selective combination of data that are received from a mobile station via the base stations and that have the same contents; wherein when functioning as the first radio network control device, the radio network control device comprising:

a congestion monitoring unit that monitors the congestion state of a line between the first radio network control device and second radio network control device; and a selective combination unit that, when the line is congested, sends the result obtained by performing the selective combination of the data received from a mobile station via the base stations, to the second radio network control device from the first radio network control device, and when the line is not congested, sends data received from the mobile station via the base stations, to the second radio network control device from the first radio network control device without performing the selective combination, wherein the selective combination unit comprises a controller that controls for each mobile station whether or not to perform the selective combination based on the congestion state of the line and the controller comprises:

a flow monitoring unit that monitors the amount of flow on the line for each mobile station; and a control unit that, based on the amount of flow, controls for each mobile station whether or not to perform the selective combination.

4. A radio network control device in a mobile communication system in which a plurality of base stations are capable of receiving data having the same contents from one mobile station, and a first and second radio network control devices are capable of performing selective combination of data that are received from a mobile station via the base stations and that have the same contents; wherein when functioning as the first radio network control device, the radio network control device comprising:

a congestion monitoring unit that monitors the congestion state of a line between the first radio network control device and second radio network control device; and a selective combination unit that, when the line is congested, sends the result obtained by performing the selective combination of the data received from a mobile station via the base stations, to the second radio network control device from the first radio network control device, and when the line is not congested, sends data received from the mobile station via the base stations, to the second radio network control device from the first radio network control device without performing the selective combination, wherein the selective combination unit comprises a controller that controls for each mobile station whether or not to perform the selective combination based on the congestion state of the line, and wherein when the radio network control device operates as the second radio network control device, the radio network control device further comprises:

a missing data monitoring unit that monitors a degree of the missing data that is received from base stations for each mobile station; and a notification unit that notifies the first radio network control device of a degree of the missing data; and when the radio network control device operates as the first radio network control device, the controller controls for each mobile station whether or not to perform the selective combination based on the notified degree of the missing data.

* * * * *